(12) United States Patent
Seiler et al.

(10) Patent No.: US 10,013,770 B2
(45) Date of Patent: Jul. 3, 2018

(54) DYNAMIC DEFINITION OF A REGION OF INTEREST FOR TRACKING NERVE FIBERS

(71) Applicant: Brainlab AG, Munich (DE)

(72) Inventors: Thomas Seiler, Puchheim (DE); Katrin Stedele, Munich (DE)

(73) Assignee: Brainlab AG, Munich (DE)

( * ) Notice: Subject to any disclaimer, the term of this patent is extended or adjusted under 35 U.S.C. 154(b) by 0 days.

(21) Appl. No.: 15/548,686

(22) PCT Filed: Feb. 19, 2015

(86) PCT No.: PCT/EP2015/053508
§ 371 (c)(1),
(2) Date: Aug. 3, 2017

(87) PCT Pub. No.: WO2016/131489
PCT Pub. Date: Aug. 25, 2016

(65) Prior Publication Data
US 2018/0005380 A1    Jan. 4, 2018

(51) Int. Cl.
*G06K 9/00* (2006.01)
*G06T 7/13* (2017.01)
*G06T 7/181* (2017.01)

(52) U.S. Cl.
CPC .............. *G06T 7/13* (2017.01); *G06T 7/181* (2017.01); *G06T 2207/10092* (2013.01); *G06T 2207/20092* (2013.01); *G06T 2207/20104* (2013.01); *G06T 2207/30016* (2013.01)

(58) Field of Classification Search
CPC .......... G01R 33/56341; G01R 33/5608; G06K 9/00201; G06T 2200/04; G06T 2207/10092; A61B 34/20; A61B 2034/252; A61B 34/30; A61B 34/76; A61B 2034/2055
USPC ........................................................ 382/131
See application file for complete search history.

(56) References Cited

U.S. PATENT DOCUMENTS

| 6,859,203 B2 | 2/2005 | van Muiswinkel et al. |
| 2016/0235289 A1 * | 8/2016 | Vazquez .................. G06T 7/62 |

OTHER PUBLICATIONS

Cardenes R. et al., "Saturn: A software application of tensor utilites for research in neuroimaging" Computer Methods and Programs in Biomedicine, Elseier, Amsterdam, NL, vol. 97, No. 3, Mar. 1, 2010 (Mar. 1, 2010), pp. 264-279, XP026914969.
Ruben Cardenes: "Saturn User Manuel", retrieved from the Internet: URL:http://www.lpi.tel.uva.es/saturn/downoads/Saturn1.0-eng.pdf [retrieved on Nov. 5, 2015] the whole document abstract, section 5, Mar. 22, 2009, XP055226177.
Sonia Pujoi: "Diffusion MRI Analysis", retrieved from the Internet: URI:http://wiki.slicer.org/slicerWiki/images/1/1f/DifusionMRIanalysis_Tutorial_SoniaPujol_2013.pdf [retrieved on Nov. 13, 2015] the whole document p. 19-p. 23; p. 67-p. 69; p. 76-p. 89, Oct. 22, 2013, XP055228431.

(Continued)

*Primary Examiner* — Charlotte M Baker
(74) *Attorney, Agent, or Firm* — Tucker Ellis LLP

(57) ABSTRACT

The invention relates to a medical data processing method for determining the position of a region of interest serving as a start condition for conducting diffusion image-based tracking of nerve fibers. In one example, the method encompasses comparing a set of tracked nerve fibers to a model of nerve fibers contained in atlas data.

20 Claims, 3 Drawing Sheets

(56) References Cited

OTHER PUBLICATIONS

Alexandra J. Golby et al., "Interactive Diffusion Tensor Tractography Visualization for Neurosurgical Planning", Neurosurgery., vol. 68, No. 2, Feb. 1, 2011, pp. 496-505, XP055225000, US. ISSN: 0148-396X, DOI: 10.1277/NEU.Ob013e3182061ebb, the whole document, abstract, Figure 2. p. 6, paragrah 1-p. 7, paragraph 1.

Neurosurgery Journal: "Interactive Diffusion Tensor Tractography Visualization for Neurosurgical Planning", Jan. 25, 2011, p. 1, XP054976179, Retrieved from the internet: URL: https://www.youtube.com/watch?v=JKErdrrtXsQ [retrieveed on Nov. 3, 2015] the whole document.

European Patent Office, International Search Report and Written Opinion dated Dec. 7, 2015 corresponding to PCT/EP2015/053508, pp. 1-16.

X.Guan et al.,"Paint and Track: Surface-based ROI Selection in DTI Fiber Tracking" Proc. Intl. Mag. Reson. Med. 15 (2007) p. 1557.

\* cited by examiner

DYNAMIC DEFINITION OF A REGION OF INTEREST FOR TRACKING NERVE FIBERS

RELATED APPLICATION DATA

This application is a national phase application of International Application No. PCT/EP2015/053508 filed Feb. 19, 2015, published in the English language.

The present invention is directed to a computer-implemented medical data processing method for determining the position of a region of interest serving as a start condition for conducting diffusion image-based tracking of nerve fibers, a corresponding computer program, a non-transitory computer-readable program storage medium storing such a program, a computer running that program or comprising that program storage medium, and a system comprising that computer.

For deterministic fiber tracking (i.e., tracking of nerve fibers in e.g., a set of medical image data) it is necessary to define seed points which are then used as input for the tracking algorithm. Seed points can be collected from automatically segmented anatomical structures. If no such objects are available or in order to find a very specific neural tract, the user has to manually define a region of interest (ROI).

In a known product such as iPlan Cranial 3.x supplied by Brainlab AG, ROIs can be created by manual outlining, by defining cubic areas or by using existing objects that are generated by e.g., an automatic segmentation. Seed points are calculated within these ROIs and are used as input for the tracking algorithm. If the result of the tracking is not as expected, ROIs can be modified and new tracking calculations can be triggered until the result is satisfying for the user.

The result however strongly depends on the extent or quality of the drawn ROI. Important fibers might not be tracked because the manually drawn regions of interest do not represent the underlying anatomy.

It is hence desirable to provide a user with a possibility of efficiently exploring the medical image data to determine the position of fiber bundles of interest to the user, which encompasses a possibility for flexible adaptation of the size of the ROI in view of the desired tracking result. Thereby, the computational effort associated with running a tracking algorithm on the complete set of medical image data, which is potentially fruitless at least in specific aspects, can be avoided.

An object of the invention therefore is to provide a possibility for efficient definition of a region of interest usable as a start condition of a nerve fiber tracking algorithm.

Aspects of the present invention and their embodiments are disclosed in the following. Different advantageous features can be combined in accordance with the invention wherever technically expedient and feasible.

EXEMPLARY SHORT DESCRIPTION OF THE PRESENT INVENTION

In the following, a short description of the specific features of the present invention is given which shall not be understood to limit the invention only to the features or a combination of the features described in this section.

The present invention relates for example to a method of determining a live preview for tracking nerve fibers in a medical image based on determining an appropriate position and size of a region of interest serving as a start condition, for example an inputted start condition, for a nerve fiber tracking algorithm. The live preview allows a user to determine whether the region of interest is acceptable for fiber tracking. In one example, that decision may be executed automatically by comparing the tracking result to predetermined information about the position of nerve fibers contained in atlas data, without the necessity of graphical output of a tracked nerve fiber or nerve fiber bundle for judging whether the tracked fiber (bundle) constitutes a desired tracking result.

GENERAL DESCRIPTION OF THE PRESENT INVENTION

In this section, a description of the general features of the present invention is given for example by referring to possible embodiments of the invention.

In one aspect, the invention is directed to a computer-implemented medical data processing method for determining the position of a region of interest serving as a start condition for conducting diffusion image-based tracking of nerve fibers.

The method comprises the following exemplary steps which are (all) constituted to be executed by a computer (for example, a specific module such as a software module can be provided which contains code which, when executed on the electronic processor of the computer, provides the data processing functionality of the respective method step). The method steps are executed for example by the processor of such a computer, for example by acquiring data sets at the processor and determining data sets by the processor.

For example, the medical image data is acquired. The medical image data describes (specifically, defines) the medical image of an anatomical body part of a patient's body comprising the nerve fiber. The anatomical body part can comprise at least part of the brain. The medical image has been generated for example by applying a diffusion-based medical imaging method (such as diffusion tensor imaging—DTI) to the anatomical body part. DTI involves generating a magnetic resonance tomography of the anatomical body part (which comprises nervous tissue and can comprise at least part of the human brain) and analysing the diffusion of water molecules in the tissue from the tomography thus generated. The medical image is described (specifically, defined) by medical image data and in one example is three-dimensional data, but can be displayed in a two-dimensional manner.

For example, actual region size data is acquired. The actual region size data describes (specifically, defines) the actual size of the region of interest. The actual size can be defined by a specific quantity, for example in image units such as pixels or voxels or by length dimensions of the anatomical structure depicted in the image part corresponding to the region of interest in the real world. The actual size is the size defined by for example a selection from the medical image. The actual size can also be zero (a null value or an empty data structure), for example in case no region of interest has been selected (yet).

For example, predetermined region size data is acquired which describes (specifically, defines) a predetermined minimum size of the region of interest. The predetermined minimum size is defined in the same quantity as the actual size. The predetermined minimum size is defined for example as being greater than zero (or not null or not being an empty data structure, respectively).

The method then continues with for example determining, based on (specifically, from) the actual region size data and predetermined region size data, whether the region of interest (described by the actual region size data) has at least the predetermined size. This determination encompasses for example comparing the value of the actual size is at least the value of the predetermined size. This comparison may serve a check whether the actual size is greater than zero so as to for example determine whether a region of interest has been defined in (specifically, selected from) the medical image. If the result of that determination is that the region of interest has at least the predetermined size, the method may carry on with executing the following steps:

acquiring region position data describing (specifically, defining) the position of the region of interest in the anatomical body part described by the position of a virtual tool in the medical image (the position of the region of interest is defined for example in two-dimensional or three-dimensional coordinates in the medical image); the region position data describes (specifically, defines) an initial position of the region of interest and may thus also be called initial region position data;

determining, based on (specifically, from) the medical image data and the region position data, fiber tracking data describing the result of tracking a nerve fiber running through the region of interest (The fiber tracking data is determined for example by applying a known fiber tracking algorithm for DTI-based fiber tracking, using the medical image data and the region position data as input for the algorithm. Usable algorithms are known to person skilled in the art and described in for example Mori, S.; van Zijl, P. C. M.: Fiber Tracking: Principles and Strategies—A Technical Review. NMR In Biomedicine (2002) 15, pp. 468-480, the entire contents of which is incorporated into the present disclosure by reference.);

determining based on (specifically, from) the fiber tracking data and the actual region size data, whether the actual size of the region of interest is smaller or larger than a desired size of the region of interest required to achieve a desired result of the tracking (the desired result of the tracking is defined for example by having a bundle of nerve fibers tracked as the result which is of interest for conducting an envisaged medical procedure such as radiotherapy or neurosurgery); and if it is determined that the actual size is smaller than the desired size, the method may continue with executing the following steps:

acquiring changed region position data describing a new position of the region of interest different from the position described by the region position data (the changed region position data is generated for example by varying positional information contained in the region position data in a direction in which a region of interest is expected which—when used as an input for determining the fiber tracking data—would lead to a more desired result of the fiber tracking);

determining, based on (specifically, from) the medical image data and the changed region position data, changed region tracking data describing a result of tracking a nerve fiber running through the region of interest at the position described by the changed region position data (for example, the medical image data and the changed region position data are used as an input for the aforementioned fiber tracking algorithm, and the fiber tracking algorithm is then re-run for determining the changed region tracking data);

determining, based on (for example, from) the changed region tracking data and the changed region position data, whether the position of the region of interest described by the changed region position data shall be added to the position of the region of interest described by the region position data (for example, it may be determined whether the region of interest described by the region position data shall be enlarged by adding the region of interest described by the changed position data to the region of interest described by the region position data; this determination involves for example a consideration whether increasing the extent/size of the region of interest would lead to a more desired result of the fiber tracking algorithm if the increased region of interest were used as an input for the fiber tracking algorithm), and if it is determined that the position of the region of interest described by the changed region position data shall be added to the position of the region of interest described by the region position data, adding, the position of the region of interest described by the changed region position data to the position of the region of interest described by the region position data, and continuing execution of the method with the step relating to (specifically, encompassing) determining whether the region of interest described by the actual region size data has at least the predetermined size;

if it is determined that the position of the region of interest described by the changed region position data shall not be added to the position of the region of interest described by the region position data, continuing execution of the method with the step relating to (specifically, encompassing) determining whether the region of interest described by the actual region size data has at least the predetermined size;

if it is determined that the actual size is not smaller than the desired size, the method may continue with executing the following steps:

determining whether the actual size is larger than the desired size, and if it is determined that the actual size is larger than the desired size, the method continues with executing the following steps:

acquiring changed region position data describing a new position of the region of interest which at least partly overlaps the position described by the region position data (the changed region position data is generated as described above, and the overlap in position is achieved for example by defining an extent of the region of interest described by the changed region position data which is at least partly identical to the extent of the region of interest described by the region position data);

determining, based on (specifically, from) the medical image data and the changed region position data, changed region tracking data describing a result of tracking a nerve fiber running through the region of interest at the position described by the changed region position data (for example, the medical image data and the changed region position data are used as an input for the aforementioned fiber tracking algorithm, and the fiber tracking algorithm is then re-run for determining the changed region tracking data);

determining, based on (specifically, from) the changed region tracking data and the changed region position data, whether the position of the region of interest described by the changed region position data shall be removed from the position of the region of interest described by the region position data (this determination involves for example a consideration whether decreasing the extent/size of the region of interest would lead to a more desired result of the fiber tracking algorithm if the decreased region of interest were used as an input for the fiber tracking algorithm), and if it is determined that the position of the region of interest described by the changed region position data shall be removed from the position of the region of interest described by the region position data, removing the position of the region of interest described by the changed region position data from the position of the region of interest described by the region position data, and continuing execution of the method with the step relating to (specifically, encompassing) determining whether the region of interest described by the actual region size data has at least the predetermined size;

if it is determined that the position of the region of interest described by the changed region position data shall not be removed from the position of the region of interest described by the region position data, continuing execution of the method with the step relating to (specifically, encompassing) determining whether the region of interest described by the actual region size data has at least the predetermined size; and if it is determined that the actual size is not larger than the desired size, ending execution of the method.

If the step relating to (specifically, encompassing) determining whether the region of interest described by the actual region size data has at least the predetermined size results in a determination that the region of interest does not have at least the predetermined size, the method continues directly with executing the step relating to (specifically, encompassing) acquiring the changed region position data.

For example, the step relating to (specifically, encompassing) determining the changed region tracking data may comprise:

determining, based on (specifically, from) the changed region position data, seed point data describing a set of seed points to be used as initial positions for tracking the nerve fibers running through the region of interest at the position described by the changed region position data;

conducting the tracking based on the seed point data to determine the changed region tracking data (for example, the fiber tracking algorithm is re-run with the seed point data and for example also the medical image data as input);

determining, based on (for example, from) the changed region tracking data, whether nerve fibers running through the region of interest at the position described by the changed region position data have been tracked (for example, by determining whether the fiber tracking algorithm has output any tracked nerve fiber), and if it is determined that nerve fibers running through the region of interest at the position described by the changed region position data have been tracked, the method continues with determining, based on (specifically, from) the changed region tracking data, tracked fiber display data describing an image rendering (outputtable for example to a display device such as a standard monitor) of the nerve fibers running through the region of interest at the position described by the changed region position data, and then continuing execution of the method with the step relating to (specifically, encompassing) determining whether the position of the region of interest described by the changed region position data shall be added to the position of the region interest described by the region position data;

if it is determined that no nerve fibers running through the region of interest at the position described by the changed region position data have been tracked, the method continues directly with execution of the step relating to (specifically, encompassing) determining whether the position of the region of interest described by the changed region position data shall be added to the position of the region of interest described by the region position data.

For example, the step relating to (specifically, encompassing) determining the changed region tracking data may comprise:

determining, based on (specifically, from) the changed region position data, seed point data describing a set of seed points to be used as initial positions for tracking the nerve fibers running through the region of interest at the position described by the changed region position data;

conducting the tracking based on the seed point data to determine the changed region tracking data (for example, the fiber tracking algorithm is re-run with the seed point data and for example also the medical image data as input);

determining, based on (specifically, from) the changed region tracking data, whether nerve fibers running through the region of interest at the position described by the changed region position data have been tracked (for example, by determining whether the fiber tracking algorithm has output any tracked nerve fiber), and if it is determined that nerve fibers running through the region of interest at the position described by the changed region position data have been tracked, determining, based on (specifically, from the changed region tracking data), tracked fiber display data describing (specifically, defining) an image rendering (outputtable for example to a display device such as a standard monitor) of the nerve fibers running through the region of interest at the position described by the changed region position data, and continuing execution of the method with the step the step relating to (specifically, encompassing) determining whether the position of the region of interest described by the changed region position data shall be removed from the position of the region of interest described by the region position data;

if it is determined that no nerve fibers running through the region of interest at the position described by the changed region position data have been tracked, continuing execution of the method with the step relating to (specifically, encompassing) determining whether the position of the region of interest described by the changed region position data shall be removed from the position of the region of interest described by the region position data.

In all cases described above, the changed region position data can be acquired based on (specifically, from) user input. For example, the user input comprises moving a virtual tool (such as a virtual pointing tool for example a mouse cursor or any other graphical selection tool which may have rectangular, circular, brush-like or box-like shape) to the position described by the changed region position data. The adding or removing, respectively, of the position of the region of interest described by the changed region position data to or from, respectively, the position of the region of interest described by the region position data may be initiated, by the processor, based on such user input.

In a further example, the method may comprise:

acquiring atlas data describing a model of anatomical body part of the patient's body comprising the nerve fibers;

wherein the steps relating to (specifically, encompassing) determining whether the actual size of the region of interest is smaller or larger than a desired size of the region of interest required to achieve a desired result of the tracking and, specifically, determining whether the actual size is not smaller than the desired size comprise:

determining, by the processor and based on (specifically, from) the atlas data and the fiber tracking data, whether the tracked nerve fiber described by fiber tracking data corresponds at least within a predetermined limit to a nerve fiber comprised in the model. This determination is effected for example on the basis of comparing the position of nerve fibers described by the fiber tracking data to the positions of nerve fibers described by the atlas data, for example by fusing the two data sets to one another.

In a further example, the method may comprise:

acquiring, at the processor, atlas data describing a model of anatomical body part of the patient's body comprising the nerve fibers;

wherein the steps relating to (specifically, encompassing) determining whether the position of the region of interest described by the changed region position data shall be added to the position of the region of interest described by the region position data and whether the position of the region of interest described by the changed region position data shall be removed from the position of the region of interest described by the region position data comprise:

determining, by the processor and based on (specifically, from) the atlas data and the changed region tracking data, whether the tracked nerve fiber described by the changed region tracking data corresponds at least within a predetermined limit to a nerve fiber comprised in the model. This determination is effected for example on the basis of comparing the position of nerve fibers described by the changed region tracking data to the positions of nerve fibers described by the atlas data, for example by fusing the two data sets to one another.

In another aspect, the invention is directed to a computer program which, when running on a computer or when loaded onto a computer, causes the computer to perform the above-described method.

In a further aspect, the invention is directed to a non-transitory computer-readable program storage medium on which the aforementioned program is stored.

In an even further aspect, the invention is directed to a computer, for example a cloud computer, comprising a processor and a memory, wherein the aforementioned program is running on the processor or is loaded into the memory, or wherein the computer comprises the aforementioned program storage medium. The computer is for example an electronic data processing unit which is specifically configured to execute the aforementioned program, for example the electronic data processing unit of a medical navigation system or a medical procedure planning system (suitable for use e.g., in surgery or radiotherapy/radiosurgery or infusion therapy, for example for treating a brain tumour).

In an even further aspect, the invention relates to a (physical, for example electrical, for example technically generated) signal wave, for example a digital signal wave, carrying information which represents the aforementioned program, which comprises code means which are adapted to perform any or all of the method steps described herein.

It is within the scope of the present invention to combine one or more features of one or more embodiments or aspects of the invention in order to form a new embodiment wherever this is technically expedient and/or feasible. Specifically, a feature of one embodiment which has the same or a similar function to another feature of another embodiment can be exchanged with said other feature, and a feature of one embodiment which adds an additional function to another embodiment can for example be added to said other embodiment.

DEFINITIONS

In this section, definitions for specific terminology used in this disclosure are offered which also form part of the present disclosure.

Within the framework of the invention, computer program elements can be embodied by hardware and/or software (this includes firmware, resident software, micro-code, etc.). Within the framework of the invention, computer program elements can take the form of a computer program product which can be embodied by a computer-usable, for example computer-readable data storage medium comprising computer-usable, for example computer-readable program instructions, "code" or a "computer program" embodied in said data storage medium for use on or in connection with the instruction-executing system. Such a system can be a computer; a computer can be a data processing device comprising means for executing the computer program elements and/or the program in accordance with the invention, for example a data processing device comprising a digital processor (central processing unit or CPU) which executes the computer program elements, and optionally a volatile memory (for example a random access memory or RAM) for storing data used for and/or produced by executing the computer program elements. Within the framework of the present invention, a computer-usable, for example computer-readable data storage medium can be any data storage medium which can include, store, communicate, propagate or transport the program for use on or in connection with the instruction-executing system, apparatus or device. The computer-usable, for example computer-readable data storage medium can for example be, but is not limited to, an electronic, magnetic, optical, electromagnetic, infrared or semiconductor system, apparatus or device or a medium of propagation such as for example the Internet. The computer-usable or computer-readable data storage medium could even for example be paper or another suitable medium onto which the program is printed, since the program could be electronically captured, for example by optically scanning the paper or other suitable medium, and then compiled, interpreted or otherwise processed in a suitable manner. The data storage medium is preferably a non-volatile data storage medium. The computer program product and any software and/or hardware described here form the various means for performing the functions of the invention in the example embodiments. The computer and/or data processing device can for example include a guidance information device which includes means for outputting guidance information. The guidance information can be outputted, for example to a user, visually by a visual indicating means (for example, a monitor and/or a lamp) and/or acoustically by an acoustic indicating means (for example, a loudspeaker and/or a digital speech output device) and/or tactilely by a tactile indicating means (for example, a vibrating element or a vibration element incorporated into an instrument). For the purpose of this document, a computer is a technical computer which for example comprises technical, for example tangible components, for example mechanical and/or electronic components. Any device mentioned as such in this document is a technical and for example tangible device.

The method in accordance with the invention is for example a data processing method. The data processing method is preferably performed using technical means, for example a computer. The data processing method is preferably constituted to be executed by or on a computer and for example is executed by or on the computer. For example, all the steps or merely some of the steps (i.e., less than the total number of steps) of the method in accordance with the invention can be executed by a computer. The computer for example comprises a processor and a memory in order to process the data, for example electronically and/or optically. The calculating steps described are for example performed by a computer. Determining steps or calculating steps are for example steps of determining data within the framework of the technical data processing method, for example within the framework of a program. A computer is for example any kind of data processing device, for example electronic data processing device. A computer can be a device which is generally thought of as such, for example desktop PCs, notebooks, netbooks, etc., but can also be any programmable apparatus, such as for example a mobile phone or an embedded processor. A computer can for example comprise a system (network) of "sub-computers", wherein each sub-computer represents a computer in its own right. The term "computer" includes a cloud computer, for example a cloud server. The term "cloud computer" includes a cloud computer system which for example comprises a system of at least one cloud computer and for example a plurality of operatively interconnected cloud computers such as a server farm. Such a cloud computer is preferably connected to a wide area network such as the world wide web (WWW) and located in a so-called cloud of computers which are all connected to the world wide web. Such an infrastructure is used for "cloud computing", which describes computation, software, data access and storage services which do not require the end user to know the physical location and/or configuration of the computer delivering a specific service.

For example, the term "cloud" is used in this respect as a metaphor for the Internet (world wide web). For example, the cloud provides computing infrastructure as a service (IaaS). The cloud computer can function as a virtual host for an operating system and/or data processing application which is used to execute the method of the invention. The cloud computer is for example an elastic compute cloud (EC2) as provided by Amazon Web Services™. A computer for example comprises interfaces in order to receive or output data and/or perform an analogue-to-digital conversion. The data are for example data which represent physical properties and/or which are generated from technical signals. The technical signals are for example generated by means of (technical) detection devices (such as for example devices for detecting marker devices) and/or (technical) analytical devices (such as for example devices for performing imaging methods), wherein the technical signals are for example electrical or optical signals. The technical signals for example represent the data received or outputted by the computer. The computer is preferably operatively coupled to a display device which allows information outputted by the computer to be displayed, for example to a user. One example of a display device is an augmented reality device (also referred to as augmented reality glasses) which can be used as "goggles" for navigating. A specific example of such augmented reality glasses is Google Glass (a trademark of Google, Inc.). An augmented reality device can be used both to input information into the computer by user interaction and to display information outputted by the computer. Another example of a display device would be a standard computer monitor comprising for example a liquid crystal display operatively coupled to the computer for receiving display control data from the computer for generating signals used to display image information content on the display device. A specific embodiment of such a computer monitor is a digital lightbox. The monitor may also be the monitor of a portable, for example handheld, device such as a smart phone or personal digital assistant or digital media player.

The expression "acquiring data" for example encompasses (within the framework of a data processing method) the scenario in which the data are determined by the data processing method or program. Determining data for example encompasses measuring physical quantities and transforming the measured values into data, for example digital data, and/or computing the data by means of a computer and for example within the framework of the method in accordance with the invention. The meaning of "acquiring data" also for example encompasses the scenario in which the data are received or retrieved by the data processing method or program, for example from another program, a previous method step or a data storage medium, for example for further processing by the data processing method or program. The expression "acquiring data" can therefore also for example mean waiting to receive data and/or receiving the data. The received data can for example be inputted via an interface. The expression "acquiring data" can also mean that the data processing method or program performs steps in order to (actively) receive or retrieve the data from a data source, for instance a data storage medium (such as for example a ROM, RAM, database, hard drive, etc.), or via the interface (for instance, from another computer or a network). The data can be made "ready for use" by performing an additional step before the acquiring step. In accordance with this additional step, the data are generated in order to be acquired. The data are for example detected or captured (for example by an analytical device).

Alternatively or additionally, the data are inputted in accordance with the additional step, for instance via interfaces. The data generated can for example be inputted (for instance into the computer). In accordance with the additional step (which precedes the acquiring step), the data can also be provided by performing the additional step of storing the data in a data storage medium (such as for example a ROM, RAM, CD and/or hard drive), such that they are ready for use within the framework of the method or program in accordance with the invention. The step of "acquiring data" can therefore also involve commanding a device to obtain and/or provide the data to be acquired. For example, the acquiring step does not involve an invasive step which would represent a substantial physical interference with the body, requiring professional medical expertise to be carried out and entailing a substantial health risk even when carried out with the required professional care and expertise. For example, the step of acquiring data, for example determining data, does not involve a surgical step and for example does not involve a step of treating a human or animal body using surgery or therapy. In order to distinguish the different data used by the present method, the data are denoted (i.e., referred to) as "XY data" and the like and are defined in terms of the information which they describe, which is then preferably referred to as "XY information" and the like.

Atlas data describes (for example defines and/or represents and/or is) for example a general three-dimensional shape of the anatomical body part. The atlas data therefore represents an atlas of the anatomical body part. An atlas typically consists of a plurality of generic models of objects, wherein the generic models of the objects together form a complex structure. For example, the atlas constitutes a statistical model of a patient's body (for example, a part of the body) which has been generated from anatomic information gathered from a plurality of human bodies, for example from medical image data containing images of such human bodies. In principle, the atlas data therefore represents the result of a statistical analysis of such medical image data for a plurality of human bodies. This result can be output as an image—the atlas data therefore contains or is comparable to medical image data. Such a comparison can be carried out for example by applying an image fusion algorithm which conducts an image fusion between the atlas data and the medical image data. The result of the comparison can be a measure of similarity between the atlas data and the medical image data. The human bodies, the anatomy of which serves as an input for generating the atlas data, advantageously share a common feature such as at least one of gender, age, ethnicity, body measurements (e.g., size and/or mass) and pathologic state. The anatomic information describes for example the anatomy of the human bodies and is extracted for example from medical image information about the human bodies. The atlas of a femur, for example, can comprise the head, the neck, the body, the greater trochanter, the lesser trochanter and the lower extremity as objects which together make up the complete structure. The atlas of a brain, for example, can comprise the telencephalon, the cerebellum, the diencephalon, the pons, the mesencephalon and the medulla as the objects which together make up the complex structure. One application of such an atlas is in the segmentation of medical images, in which the atlas is matched to medical image data, and the image data are compared with the matched atlas in order to assign a point (a pixel or voxel) of the image data to an object of the matched atlas, thereby segmenting the image data into objects. Anatomical structures are assigned grey values describing their response to at least one type of imaging radiation (such as their absorption of x-rays, defined for example in Hounsfield units). Thus, tissue types can be grouped into classes (so-called tissue classes) which define a specific type of tissue according to its physical properties such as absorption of the type of imaging radiation. The atlas can also be multi-modal, i.e., an atlas comprising tissue classes (tissue type information) which describes the image appearance of specific type of tissue in different imaging modalities, e.g., in x-ray-based imaging and magnetic resonance-based imaging, to allow matching the atlas with medical images having been generated by the corresponding imaging modality.

Image fusion can be elastic image fusion or rigid image fusion. In the case of rigid image fusion, the relative position between the pixels of a 2D image and/or voxels of a 3D image is fixed, while in the case of elastic image fusion, the relative positions are allowed to change.

In this application, the term "image morphing" is also used as an alternative to the term "elastic image fusion", but with the same meaning.

Within the framework of this disclosure, the term of transformation denotes a linear mapping (embodied for example by a matrix multiplication) defining an image fusion algorithm such as at least one of an elastic and an inelastic fusion transformation. Elastic fusion transformations (for example, elastic image fusion transformations) are for example designed to enable a seamless transition from one dataset (for example a first dataset such as for example a first image) to another dataset (for example a second dataset such as for example a second image). The transformation is for example designed such that one of the first and second datasets (images) is deformed, for example in such a way that corresponding structures (for example, corresponding image elements) are arranged at the same position as in the other of the first and second images. The deformed (transformed) image which is transformed from one of the first and second images is for example as similar as possible to the other of the first and second images. Preferably, (numerical) optimisation algorithms are applied in order to find the transformation which results in an optimum degree of similarity. The degree of similarity is preferably measured by way of a measure of similarity (also referred to in the following as a "similarity measure"). The parameters of the optimisation algorithm are for example vectors of a deformation field. These vectors are determined by the optimisation algorithm in such a way as to result in an optimum degree of similarity. Thus, the optimum degree of similarity represents a condition, for example a constraint, for the optimisation algorithm. The bases of the vectors lie for example at voxel positions of one of the first and second images which is to be transformed, and the tips of the vectors lie at the corresponding voxel positions in the transformed image. A plurality of these vectors are preferably provided, for instance more than twenty or a hundred or a thousand or ten thousand, etc. Preferably, there are (other) constraints on the transformation (deformation), for example in order to avoid pathological deformations (for instance, all the voxels being shifted to the same position by the transformation). These constraints include for example the constraint that the transformation is regular, which for example means that a Jacobian determinant calculated from a matrix of the deformation field (for example, the vector field) is larger than zero, and also the constraint that the transformed (deformed) image is not self-intersecting and for example that the transformed (deformed) image does not comprise faults and/or ruptures. The constraints include for example the constraint that if a regular grid is transformed simultaneously with the image and in a corresponding manner, the grid is not allowed to interfold at any of its locations. The optimising problem is for example solved iteratively, for example by means of an optimisation algorithm which is for example a first-order optimisation algorithm, for example a gradient descent algorithm. Other examples of optimisation algorithms include optimisation algorithms which do not use derivations, such as the downhill simplex algorithm, or algorithms which use higher-order derivatives such as Newton-like algorithms. The optimisation algorithm preferably performs a local optimisation. If there is a plurality of local optima, global algorithms such as simulated annealing or generic algorithms can be used. In the case of linear optimisation problems, the simplex method can for instance be used.

In the steps of the optimisation algorithms, the voxels are for example shifted by a magnitude in a direction such that the degree of similarity is increased. This magnitude is preferably less than a predefined limit, for instance less than one tenth or one hundredth or one thousandth of the diameter of the image, and for example about equal to or less than the distance between neighbouring voxels. Large deformations can be implemented, for example due to a high number of (iteration) steps.

The determined elastic fusion transformation can for example be used to determine a degree of similarity (or similarity measure, see above) between the first and second datasets (first and second images). To this end, the deviation between the elastic fusion transformation and an identity transformation is determined. The degree of deviation can for instance be calculated by determining the difference between the determinant of the elastic fusion transformation and the identity transformation. The higher the deviation, the lower the similarity, hence the degree of deviation can be used to determine a measure of similarity.

A measure of similarity can for example be determined on the basis of a determined correlation between the first and second datasets.

DESCRIPTION OF THE FIGURES

In the following, the invention is described with reference to the appended figures which represent a specific embodiment of the invention. The scope of the invention is not however limited to the specific features disclosed in the context of the figures, wherein

FIG. 1 presents an overview of the steps of the disclosed computer-implemented medical data processing method. The method, for example, starts with execution of step S1 which encompasses acquisition of the medical image data. Subsequent step S2 encompasses evaluating the previously acquired actual region size data and predetermined region size data (not shown in FIG. 1) as to whether the region of interest has at least the predetermined size. If this is the case, the method continues with step S3. If the region of interest does not have at least the predetermined size, the method continues with step S4.

Step S4 encompasses acquiring the changed region position data which is acquired for example by moving the pointing tool to a new (different) position in the medical image. Then the changed region position data is acquired in step S5.

Figure 1:
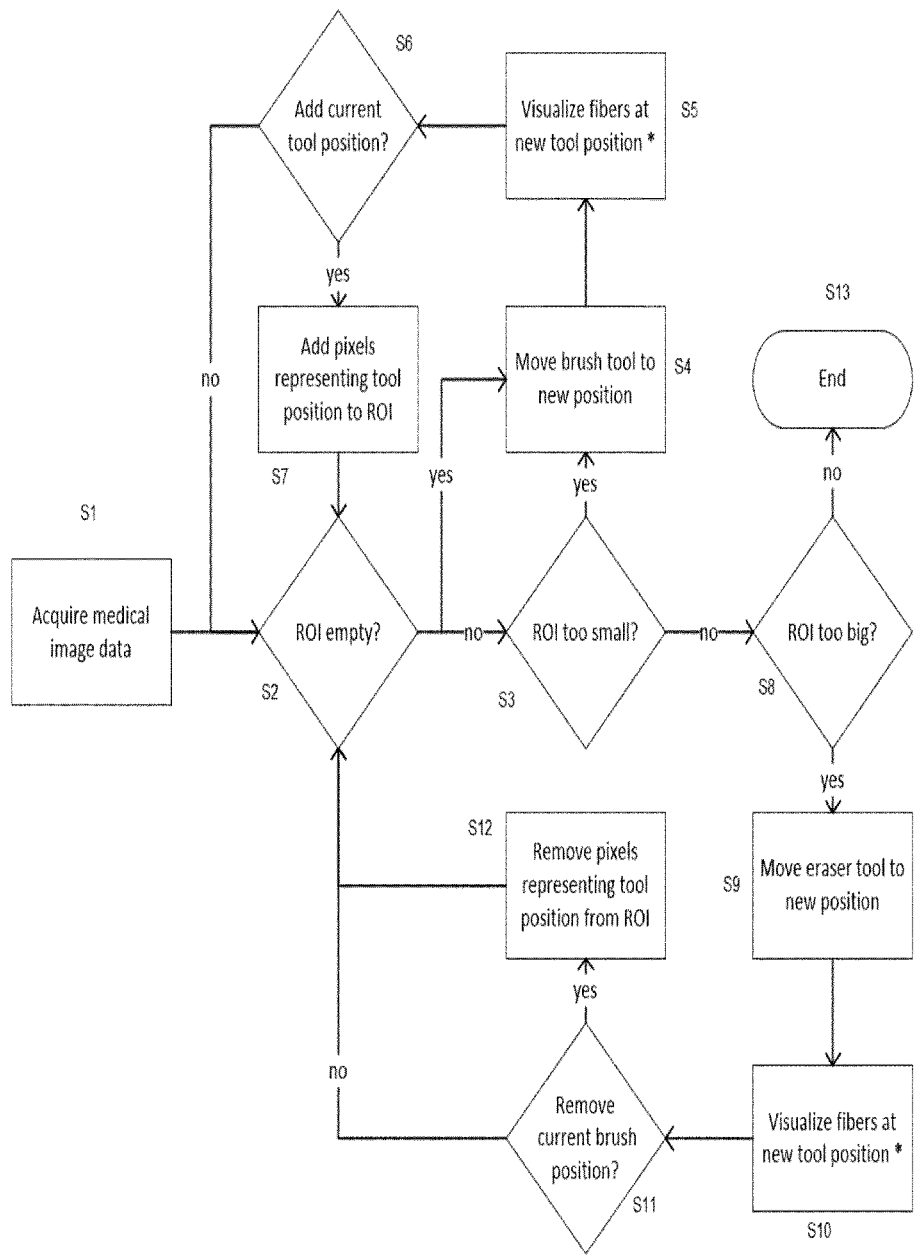
FIG. 1 is a flow diagram showing the basic steps of the disclosed method.
Figure 2:
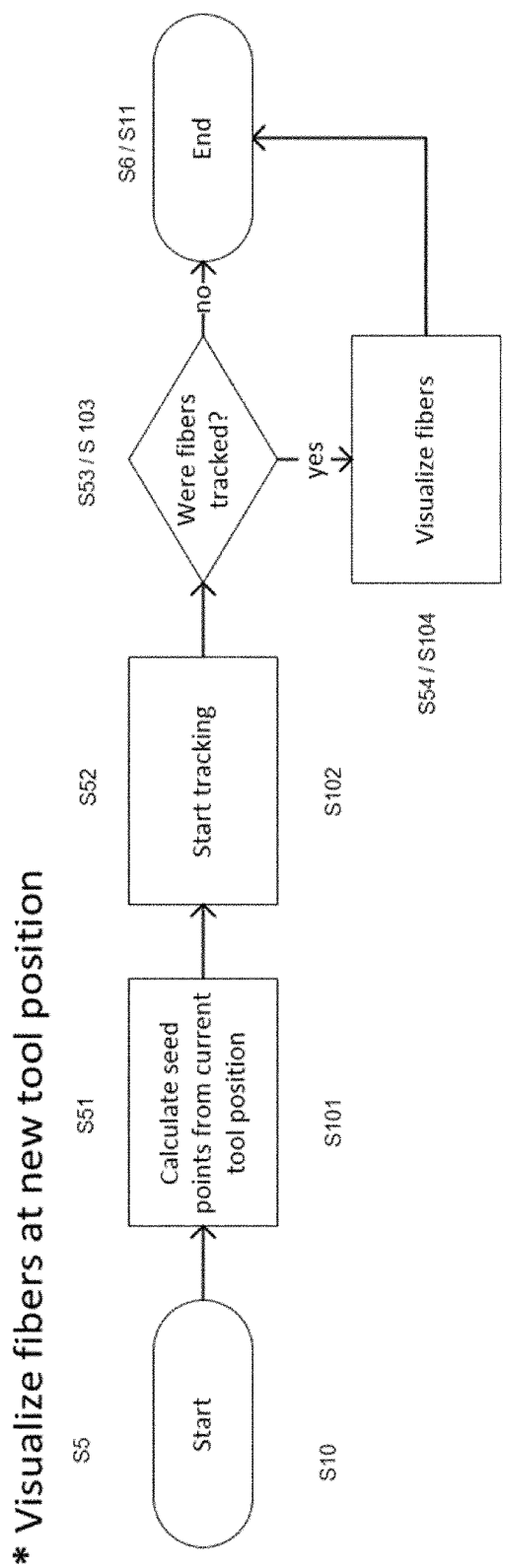
FIG. 2 is an inset describing two functional blocks of the diagram of FIG. 1.

Step S5 can be implemented as shown in FIG. 2 by steps S51 to S54. Step S51 encompasses determining the seed point data, which is followed by step S52 which encompasses conducting the tracking based on the seed point data to determine the changed region tracking data. Subsequent step S53 encompasses determining whether nerve fibers running through the region of interest described by the changed region position data have been tracked. If this is the case, the tracked fiber display data is determined in step S54, and the method continues with step S6 encompassing determining whether the position of the region of interest described by the changed region position data shall be added to the position of the region of interest described by the region position data. If step S53 results in that no nerve fibers running through the region of interest described by the changed region position data have been tracked, the method continues directly with step S6.

If the result of the determination in step S6 is positive, step S7 is executed which encompasses adding the position of the region of interest described by the changed region position data to the position of the region of interest described by the region position data. If the result of the determination in step S6 is negative, the method continues directly with a repeated execution of step S2.

Step S3 encompasses determining whether the actual size of the region of interest is smaller or larger than a desired size of the region of interest to achieve a desired result of the tracking. If the actual size is smaller than the desired size (yes in step S3), the method continues with execution of step S4. If the actual size is not smaller than the desired size (no in step S8), the method continues with execution of step S8 which encompasses determining whether the actual size is larger than the desired size. If this is not the case, execution of the method ends in step S13.

If step S8 results in that the actual size is larger than the desired size (yes in step S8), the method enters into executing step S9 which encompasses acquiring the changed region position data, the changed position being defined for example by moving the pointing tool to a new (different position). In subsequent step S10, the changed region tracking data is determined.

Step S10 can be implemented in the same way as step S5 (as shown in FIG. 2), wherein step S10 encompasses execution of steps S101 to S104 which correspond to the above-described steps S51 to S54.

Step S10 is followed by step S11 which encompasses determining whether the position of the region of interest described by the changed region position data shall be removed from the position of the region of interest described by the region position data. If this is the case (yes in step S11), the position of the region of interest described by the changed region position data is removed from the position of the region of interest in subsequent step S12. After that, the method continues with a repeated execution of step S2.

If step S11 results in that the position of the region of interest described by the changed region position data shall be not removed (no in step S11), the position of the region of interest described by the region position data, the method continues directly with a repeated execution of step S2.

Figure 3:
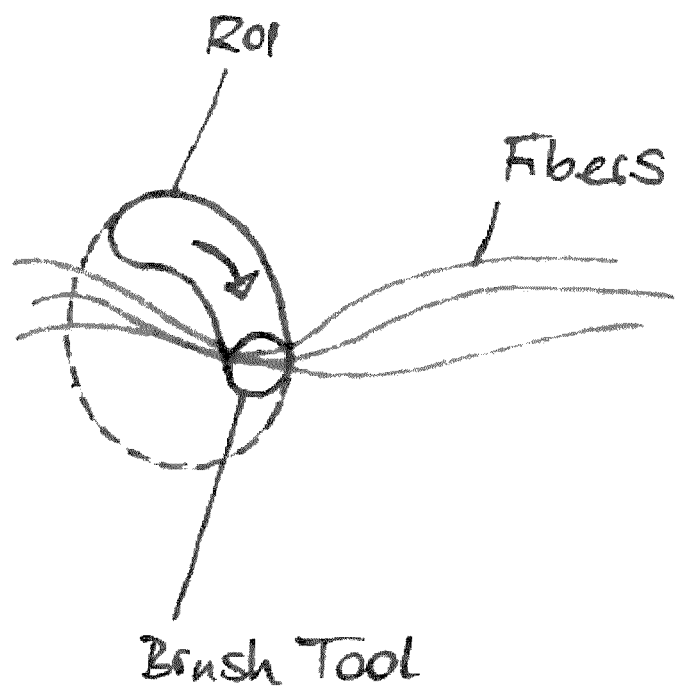
FIG. 3 shows the functionality of a selection tool operated to generate the initial position data.

FIG. 3 shows use of a brush-shaped pointing tool ("Brush Tool") which is moved in a circular manner to define a circular region of interest ("ROI") in the medical image, while—for example upon releasing a mouse button for entering a command corresponding to a decision "no" in step S3 and a decision "yes" in step S8—a live tracking of nerve fibers ("Fibers") as preview functionality is executed. Based on the image of tracked fibers (corresponding to the result of the tracking defined by the changed region tracking data—specifically, only nerve fibers are tracked which intersect the region of interest), the user can decide how to continue outgoing from steps S5 and S10, respectively. Alternatively, this decision can be made automatically based on the above-described comparison between the changed region tracking data and the atlas data.

Any number of seed points are placed within the region of interest defined by the trajectory of the brush-shaped pointing tool in the medical image. These points are used as starting points for later tracking with this region of interest. The area itself is kept to enable logical operations when tracking with more than one region of interest.

Further optional features of the disclosed method include:
- Fade out fibers obtained from a predetermined number of last cursor positions to enrich the display by showing which fibers would appear when tracking the manual ROI due to the latest changes.
- Do not use the complete brush shape as input for the live tracking but only part of the brush shape, such as its centre or border.
- Give feedback to the user if the average fractional anisotropy values obtained in the recent live tracking differ too much compared to the last cursor positions in order to improve border detection.
- Give feedback to the user if the tracked fibers lead to a significant different location in the brain than the ones tracked before.
- Enrich the visualization of the brush cursor by visualizing an interpolated FA in each pixel or at least voxel by using a e.g., a different brightness. This makes it easier to understand changes in the tracking results when moving the brush.

The disclosed method provides the following benefits: Wrong and incomplete results are avoided by getting immediate visual feedback. The brush for outlining has a certain shape. All areas covered by this shape are added or removed to/from the current ROI depending on the selected tool (brush or eraser). In parallel, fiber tracking is performed with seed points calculated from the shape of the current tool and the current tool position. When the tool is moved to a different location, the last tracking result is removed and new fibers are calculated based on the new position. The user gets direct feedback (i.e., live preview) about the effect of adding/removing the current tool position to the ROI. Borders of fiber bundles, changes of the diffusion pathways and diffusion changes regarding the local fractional anisotropy are available immediately and help the user to outline his ROI as accurate as possible based on the quality of the underlying data and the brush shape.

The invention claimed is:

1. A method for determining a position of a region of interest serving as a start condition for conducting diffusion image-based tracking of nerve fibers, the method executing on a processor of a computer, and comprising:
   a) acquiring, at the processor, medical image data describing a medical image of an anatomical body part of a patient's body comprising the nerve fibers, the medical image generated by applying a diffusion-based medical imaging method to the anatomical body part;
   b) acquiring, at the processor, actual region size data describing the actual size of the region of interest;
   c) acquiring, at the processor, predetermined region size data describing a predetermined minimum size of the region of interest;
   d) determining, by the processor and based on the actual region size data and predetermined region size data, whether the region of interest has at least the predetermined size, and
   e) if step d) results in a determination that the region of interest has at least the predetermined size,
      e1) acquiring, at the processor, region position data describing the position of the region of interest in the anatomical body part described by a position of a virtual tool in the medical image;
      e2) determining, by the processor and based on the medical image data and the region position data, fiber tracking data describing a result of tracking a nerve fiber running through the region of interest;
      e3) determining, by the processor and based on the fiber tracking data and the actual region size data, whether the actual size of the region of interest is smaller or larger than a desired size of the region of interest required to achieve a desired result of the tracking, and
         if it is determined that the actual size is smaller than the desired size,
         e3a) acquiring, at the processor, changed region position data describing a new position of the region of interest different from the position described by the region position data;
         e3b) determining, by the processor and based on the medical image data and the changed region position data, changed region tracking data describing a result of tracking a nerve fiber running through the region of interest at the position described by the changed region position data;
         e3c) determining, by the processor and based on the changed region tracking data and the changed region position data, whether the position of the region of interest described by the changed region position data shall be added to the position of the region of interest described by the region position data, and
            if it is determined that the position of the region of interest described by the changed region position data shall be added to the position of the region of interest described by the region position data,
            e3c1) adding, by the processor, the position of the region of interest described by the changed region position data to the position of the region of interest described by the region position data, and continuing, by the processor, execution of the method with step d);
            if it is determined that the position of the region of interest described by the changed region position data shall not be added to the position of the region of interest described by the region position,
            e3c2) continuing, by the processor, execution of the method with step d);
         if it is determined that the actual size is not smaller than the desired size,
         e3d) determining, by the processor, whether the actual size is larger than the desired size, and
            if it is determined that the actual size is larger than the desired size, e3d1) acquiring, at the processor, changed region position data describing a new position of the region of interest which at least partly overlaps the position described by the region position data;

e3d2) determining, by the processor and based on the medical image data and the changed region position data, changed region tracking data describing a result of tracking a nerve fiber running through the region of interest at the position described by the changed region position data;

e3d3) determining, by the processor and based on the changed region tracking data and the changed region position data, whether the position of the region of interest described by the changed region position data shall be removed from the position of the region of interest described by the region position data, and if it is determined that the position of the region of interest described by the changed region position data shall be removed from the position of the region of interest described by the region position data, e3d3i) removing, by the processor, the position of the region of interest described by the changed region position data from the position of the region of interest described by the region position data, and e3d3ii) continuing execution of the method with step d);

if it is determined that the position of the region of interest described by the changed region position data shall not be removed from the position of the region of interest described by the region position data, e3d3iii) continuing, by the processor, execution of the method with step d); and if it is determined that the actual size is not larger than the desired size, e3d4) ending, by the processor, execution of the method; and f) if step d) results in a determination that the region of interest does not have at least the predetermined size, continuing, by the processor, execution of the method with step e3a).

2. The method according to claim 1, wherein step e3b) comprises:

e3b1) determining, by the processor and based on the changed region position data, seed point data describing a set of seed points to be used as initial positions for tracking the nerve fibers running through the region of interest at the position described by the changed region position data;

e3b2) conducting, by the processor, the tracking based on the seed point data to determine the changed region tracking data;

e3b3) determining, by the processor and based on the changed region tracking data, whether nerve fibers running through the region of interest at the position described by the changed region position data have been tracked, and if it is determined that nerve fibers running through the region of interest at the position described by the changed region position data have been tracked, e3b3i) determining, by the processor and based on the changed region tracking data, tracked fiber display data describing an image rendering of the nerve fibers running through the region of interest at the position described by the changed region position data, and e3b3ii) continuing, by the processor, execution of the method with step e3c);

if it is determined that no nerve fibers running through the region of interest at the position described by the changed region position data have been tracked, e3b3ii) continuing, by the processor, execution of the method with step e3c).

3. The method according to claim 1, wherein step e3d2) comprises:

e3d2i) determining, by the processor and based on the changed region position data, seed point data describing a set of seed points to be used as initial positions for tracking the nerve fibers running through the region of interest at the position described by the changed region position data;

e3d2ii) conducting, by the processor, the tracking based on the seed point data to determine the changed region tracking data;

e3d2iii) determining, by the processor and based on the changed region tracking data, whether nerve fibers running through the region of interest at the position described by the changed region position data have been tracked, and if it is determined that nerve fibers running through the region of interest at the position described by the changed region position data have been tracked, e3d2iiiA) determining, by the processor and based on the changed region tracking data, tracked fiber display data describing an image rendering of the nerve fibers running through the region of interest at the position described by the changed region position data, and e3d2iiiB) continuing execution of the method with step e3d3);

if it is determined that no nerve fibers running through the region of interest at the position described by the changed region position data have been tracked, e3d2iiiB) continuing, by the processor, execution of the method with step e3d3).

4. The method according to claim 1, wherein the changed region position data is acquired in step e3a) or step e3d1) based on user input.

5. The method according to claim 1, wherein the adding or removing, respectively, of the position of the region of interest described by the changed region position data to or from, respectively, the position of the region of interest described by the region position data is initiated, by the processor, based on user input.

6. The method according to claim 4, wherein the user input comprises moving the virtual tool to the position described by the changed region position data.

7. The method according to claim 6, wherein the virtual tool is a virtual pointing tool.

8. The method according to claim 1, further comprising:
acquiring, at the processor, atlas data describing a model of an anatomical body part of the patient's body comprising the nerve fibers;
wherein steps e3) and e3d) comprise:
determining, by the processor and based on the atlas data and the fiber tracking data, whether the tracked nerve fiber described by fiber tracking data corresponds at least within a predetermined limit to a nerve fiber comprised in the model.

9. The method according to claim 1, further comprising:
acquiring, at the processor, atlas data describing a model of an anatomical body part of the patient's body comprising the nerve fibers;
wherein steps e3c) and e3d3) comprise:
determining, by the processor and based on the atlas data and the changed region tracking data, whether the tracked nerve fiber described by the changed region tracking data corresponds at least within a predetermined limit to a nerve fiber comprised in the model.

10. A non-transitory computer-readable storage medium storing a program for determining a position of a region of interest serving as a start condition for conducting diffusion image-based tracking of nerve fibers, which, when running on a computer or loaded onto a computer, causes the computer to:
a) acquire, at a processor of the computer, medical image data describing a medical image of an anatomical body part of a patient's body comprising the nerve fibers, the medical image generated by applying a diffusion-based medical imaging method to the anatomical body part;
b) acquire, at the processor, actual region size data describing the actual size of the region of interest;
c) acquire, at the processor, predetermined region size data describing a predetermined minimum size of the region of interest;
d) determine, by the processor and based on the actual region size data and predetermined region size data, whether the region of interest has at least the predetermined size, and
e) if step d) results in a determination that the region of interest has at least the predetermined size,
e1) acquire, at the processor, region position data describing the position of the region of interest in the anatomical body part described by a position of a virtual tool in the medical image;
e2) determine, by the processor and based on the medical image data and the region position data, fiber tracking data describing a result of tracking a nerve fiber running through the region of interest;
e3) determine, by the processor and based on the fiber tracking data and the actual region size data, whether the actual size of the region of interest is smaller or larger than a desired size of the region of interest required to achieve a desired result of the tracking, and
if it is determined that the actual size is smaller than the desired size,
e3a) acquire, at the processor, changed region position data describing a new position of the region of interest different from the position described by the region position data;
e3b) determine, by the processor and based on the medical image data and the changed region position data, changed region tracking data describing a result of tracking a nerve fiber running through the region of interest at the position described by the changed region position data;
e3c) determine, by the processor and based on the changed region tracking data and the changed region position data, whether the position of the region of interest described by the changed region position data shall be added to the position of the region of interest described by the region position data, and
if it is determined that the position of the region of interest described by the changed region position data shall be added to the position of the region of interest described by the region position data,
e3c1) add, by the processor, the position of the region of interest described by the changed region position data to the position of the region of interest described by the region position data, and continue, by the processor, step d);
if it is determined that the position of the region of interest described by the changed region position data shall not be added to the position of the region of interest described by the region position data,
e3c2) continue, by the processor, step d);
if it is determined that the actual size is not smaller than the desired size,
e3d) determine, by the processor, whether the actual size is larger than the desired size, and
if it is determined that the actual size is larger than the desired size,
e3d1) acquire, at the processor, changed region position data describing a new position of the region of interest which at least partly overlaps the position described by the region position data;
e3d2) determine, by the processor and based on the medical image data and the changed region position data, changed region tracking data describing a result of tracking a nerve fiber running through the region of interest at the position described by the changed region position data;
e3d3) determine, by the processor and based on the changed region tracking data and the changed region position data, whether the position of the region of interest described by the changed region position data shall be removed from the position of the region of interest described by the region position data, and
if it is determined that the position of the region of interest described by the changed region position data shall be removed from the position of the region of interest described by the region position data,
e3d3i) remove, by the processor, the position of the region of interest described by the changed region position data from the position of the region of interest described by the region position data, and
e3d3ii) continue step d);
if it is determined that the position of the region of interest described by the changed region position data shall not be removed from the position of the region of interest described by the region position data,
e3d3iii) continue, by the processor, step d); and
if it is determined that the actual size is not larger than the desired size,
e3d4) ending, by the processor, of steps a) to e); and
f) if step d) results in a determination that the region of interest does not have at least the predetermined size, continue, by the processor, step e3a).

11. The non-transitory computer-readable storage medium according to claim 10, wherein the adding or removing, respectively, of the position of the region of interest described by the changed region position data to or from, respectively, the position of the region of interest described by the region position data is initiated, by the processor, based on user input.

12. A computer comprising the non-transitory computer readable storage medium according to claim 10.

13. The non-transitory computer-readable storage medium according to claim 10, wherein step e3b) comprises:
  e3b1) determining, by the processor and based on the changed region position data, seed point data describing a set of seed points to be used as initial positions for tracking the nerve fibers running through the region of interest at the position described by the changed region position data;
  e3b2) conducting, by the processor, the tracking based on the seed point data to determine the changed region tracking data;
  e3b3) determining, by the processor and based on the changed region tracking data, whether nerve fibers running through the region of interest at the position described by the changed region position data have been tracked, and
  if it is determined that nerve fibers running through the region of interest at the position described by the changed region position data have been tracked,
  e3b3i) determining, by the processor and based on the changed region tracking data, tracked fiber display data describing an image rendering of the nerve fibers running through the region of interest at the position described by the changed region position data, and
  e3b3ii) continuing, by the processor, execution with step e3c);
  if it is determined that no nerve fibers running through the region of interest at the position described by the changed region position data have been tracked,
  e3b3ii) continuing, by the processor, execution with step e3c).

14. The non-transitory computer-readable storage medium according to claim 10, wherein step e3d2) comprises:
  e3d2i) determining, by the processor and based on the changed region position data, seed point data describing a set of seed points to be used as initial positions for tracking the nerve fibers running through the region of interest at the position described by the changed region position data;
  e3d2ii) conducting, by the processor, the tracking based on the seed point data to determine the changed region tracking data;
  e3d2iii) determining, by the processor and based on the changed region tracking data, whether nerve fibers running through the region of interest at the position described by the changed region position data have been tracked, and
  if it is determined that nerve fibers running through the region of interest at the position described by the changed region position data have been tracked,
  e3d2iiiA) determining, by the processor and based on the changed region tracking data, tracked fiber display data describing an image rendering of the nerve fibers running through the region of interest at the position described by the changed region position data, and
  e3d2iiiB) continuing execution with step e3d3);
  if it is determined that no nerve fibers running through the region of interest at the position described by the changed region position data have been tracked,
  e3d2iiiB) continuing, by the processor, execution with step e3d3).

15. The non-transitory computer-readable storage medium according to claim 10, wherein the changed region position data is acquired in step e3a) or step e3d1) based on user input.

16. A method for determining a position of a region of interest serving as a start condition for conducting diffusion image-based tracking of nerve fibers, the method executing on a processor of a computer, and comprising:
  a) acquiring, at the processor, medical image data describing a medical image of an anatomical body part of a patient's body comprising the nerve fibers, the medical image generated by applying a diffusion-based medical imaging method to the anatomical body part;
  b) acquiring, at the processor, actual region size data describing the actual size of the region of interest;
  c) acquiring, at the processor, predetermined region size data describing a predetermined minimum size of the region of interest;
  d) determining, by the processor and based on the actual region size data and predetermined region size data, whether the region of interest has at least the predetermined size, and
  e) if step d) results in a determination that the region of interest has at least the predetermined size,
    e1) acquiring, at the processor, region position data describing the position of the region of interest in the anatomical body part described by a position of a virtual tool in the medical image;
    e2) determining, by the processor and based on the medical image data and the region position data, fiber tracking data describing a result of tracking a nerve fiber running through the region of interest;
    e3) determining, by the processor and based on the fiber tracking data and the actual region size data, whether the actual size of the region of interest is smaller or larger than a desired size of the region of interest required to achieve a desired result of the tracking, and
    if it is determined that the actual size is smaller than the desired size,
    e3a) acquiring, at the processor and based on user input, changed region position data describing a new position of the region of interest different from the position described by the region position data;
    e3b) determining, by the processor and based on the medical image data and the changed region position data, changed region tracking data describing a result of tracking a nerve fiber running through the region of interest at the position described by the changed region position data;
    e3c) determining, by the processor and based on the changed region tracking data and the changed region position data, whether the position of the region of interest described by the changed region position data shall be added to the position of the region of interest described by the region position data, and if it is determined that the position of the region of interest described by the changed region position data shall be added to the position of the region of interest described by the region position data,
    e3c1) adding, by the processor and based on the user input, the position of the region of interest described by the changed region position data to the position of the region of interest described by the region position data, and continuing, by the processor, execution of the method with step d);
if it is determined that the position of the region of interest described by the changed region position data shall not be added to the position of the region of interest described by the region position,
    e3c2) continuing, by the processor, execution of the method with step d);
if it is determined that the actual size is not smaller than the desired size,
e3d) determining, by the processor and based on the user input, whether the actual size is larger than the desired size, and
    if it is determined that the actual size is larger than the desired size,
    e3d1) acquiring, at the processor and based on user input, changed region position data describing a new position of the region of interest which at least partly overlaps the position described by the region position data;
    e3d2) determining, by the processor and based on the medical image data and the changed region position data, changed region tracking data describing a result of tracking a nerve fiber running through the region of interest at the position described by the changed region position data;
    e3d3) determining, by the processor and based on the changed region tracking data and the changed region position data, whether the position of the region of interest described by the changed region position data shall be removed from the position of the region of interest described by the region position data, and
        if it is determined that the position of the region of interest described by the changed region position data shall be removed from the position of the region of interest described by the region position data,
        e3d3i) removing, by the processor and based on user input, the position of the region of interest described by the changed region position data from the position of the region of interest described by the region position data, and
        e3d3ii) continuing execution of the method with step d);
        if it is determined that the position of the region of interest described by the changed region position data shall not be removed from the position of the region of interest described by the region position data,
        e3d3iii) continuing, by the processor, execution of the method with step d); and if it is determined that the actual size is not larger than the desired size,
    e3d4) ending, by the processor, execution of the method; and
f) if step d) results in a determination that the region of interest does not have at least the predetermined size, continuing, by the processor, execution of the method with step e3a).

17. The method according to claim 16, further comprising:
acquiring, at the processor, atlas data describing a model of an anatomical body part of the patient's body comprising the nerve fibers;
wherein steps e3c) and e3d3) comprise:
    determining, by the processor and based on the atlas data and the changed region tracking data, whether the tracked nerve fiber described by the changed region tracking data corresponds at least within a predetermined limit to a nerve fiber comprised in the model.

18. The method according to claim 16, wherein step e3d2) comprises:
    e3d2i) determining, by the processor and based on the changed region position data, seed point data describing a set of seed points to be used as initial positions for tracking the nerve fibers running through the region of interest at the position described by the changed region position data;
    e3d2ii) conducting, by the processor, the tracking based on the seed point data to determine the changed region tracking data;
    e3d2iii) determining, by the processor and based on the changed region tracking data, whether nerve fibers running through the region of interest at the position described by the changed region position data have been tracked, and
        if it is determined that nerve fibers running through the region of interest at the position described by the changed region position data have been tracked,
        e3d2iiiA) determining, by the processor and based on the changed region tracking data, tracked fiber display data describing an image rendering of the nerve fibers running through the region of interest at the position described by the changed region position data, and
        e3d2iiiB) continuing execution of the method with step e3d3);
        if it is determined that no nerve fibers running through the region of interest at the position described by the changed region position data have been tracked,
        e3d2iiiB) continuing, by the processor, execution of the method with step e3d3).

19. The method according to claim 16, wherein step e3d2) comprises:
    e3d2i) determining, by the processor and based on the changed region position data, seed point data describing a set of seed points to be used as initial positions for tracking the nerve fibers running through the region of interest at the position described by the changed region position data;
    e3d2ii) conducting, by the processor, the tracking based on the seed point data to determine the changed region tracking data;
    e3d2iii) determining, by the processor and based on the changed region tracking data, whether nerve fibers running through the region of interest at the position described by the changed region position data have been tracked, and if it is determined that nerve fibers running through the region of interest at the position described by the changed region position data have been tracked, e3d2iiiA) determining, by the processor and based on the changed region tracking data, tracked fiber display data describing an image rendering of the nerve fibers running through the region of interest at the position described by the changed region position data, and e3d2iiiB) continuing execution of the method with step e3d3);

if it is determined that no nerve fibers running through the region of interest at the position described by the changed region position data have been tracked, e3d2iiiB) continuing, by the processor, execution of the method with step e3d3).

20. The method according to claim 16, further comprising:

acquiring, at the processor, atlas data describing a model of an anatomical body part of the patient's body comprising the nerve fibers;

wherein steps e3) and e3d) comprise:

determining, by the processor and based on the atlas data and the fiber tracking data, whether the tracked nerve fiber described by fiber tracking data corresponds at least within a predetermined limit to a nerve fiber comprised in the model.

* * * * *